United States Patent [19]

Crawford

[11] Patent Number: 5,265,561
[45] Date of Patent: * Nov. 30, 1993

[54] PROCESSED CARDBOARD AND WOOD BEDDING PRODUCT AND METHOD

[75] Inventor: John R. Crawford, Inver Grove Heights, Minn.

[73] Assignee: Solid Waste Management Systems, Inc., Minneapolis, Minn.

[*] Notice: The portion of the term of this patent subsequent to Jul. 28, 2009 has been disclaimed.

[21] Appl. No.: 918,977

[22] Filed: Jul. 24, 1992

Related U.S. Application Data

[63] Continuation-in-part of Ser. No. 841,713, Feb. 26, 1992, Pat. No. 5,133,296.

[51] Int. Cl.⁵ ............................................. A01K 1/015
[52] U.S. Cl. .................................................... 119/172
[58] Field of Search .............................. 119/172, 173

[56] References Cited

U.S. PATENT DOCUMENTS

| | | |
|---|---|---|
| 69,376 | 10/1867 | Walton . |
| 3,059,615 | 10/1962 | Kuceski et al. . |
| 3,284,273 | 11/1966 | Prentice . |
| 4,038,944 | 8/1977 | Tucci . |
| 4,502,415 | 3/1985 | Schwarzkopff et al. . |
| 4,619,862 | 10/1986 | Sokolowski et al. ........... 119/172 X |
| 4,621,011 | 11/1986 | Fleischer et al. ................ 119/172 X |
| 4,625,679 | 12/1986 | Hill ....................................... 119/172 |
| 4,676,196 | 6/1987 | Lojek et al. . |
| 5,018,482 | 5/1991 | Stanislowski et al. . |
| 5,044,324 | 9/1991 | Morgan et al. . |
| 5,133,296 | 7/1992 | Crawford ............................ 119/172 |

FOREIGN PATENT DOCUMENTS

| | | |
|---|---|---|
| 663288 | 5/1963 | Canada . |
| 433221 | 11/1990 | European Pat. Off. . |
| 2511843 | 8/1981 | France . |
| 8304094 | 11/1983 | Netherlands . |

Primary Examiner—Gene Mancene
Assistant Examiner—Thomas Price
Attorney, Agent, or Firm—Merchant, Gould, Smith, Edell, Welter & Schmidt

[57] ABSTRACT

An animal bedding product is made from waste cardboard and wood pallets by shredding selected amounts of cardboard and wood pallets to provide a blended mixture of wood chips and cardboard pieces ranging in size from approximately 3/16 or ½ inch ot about 1½ inches in length.

11 Claims, 1 Drawing Sheet

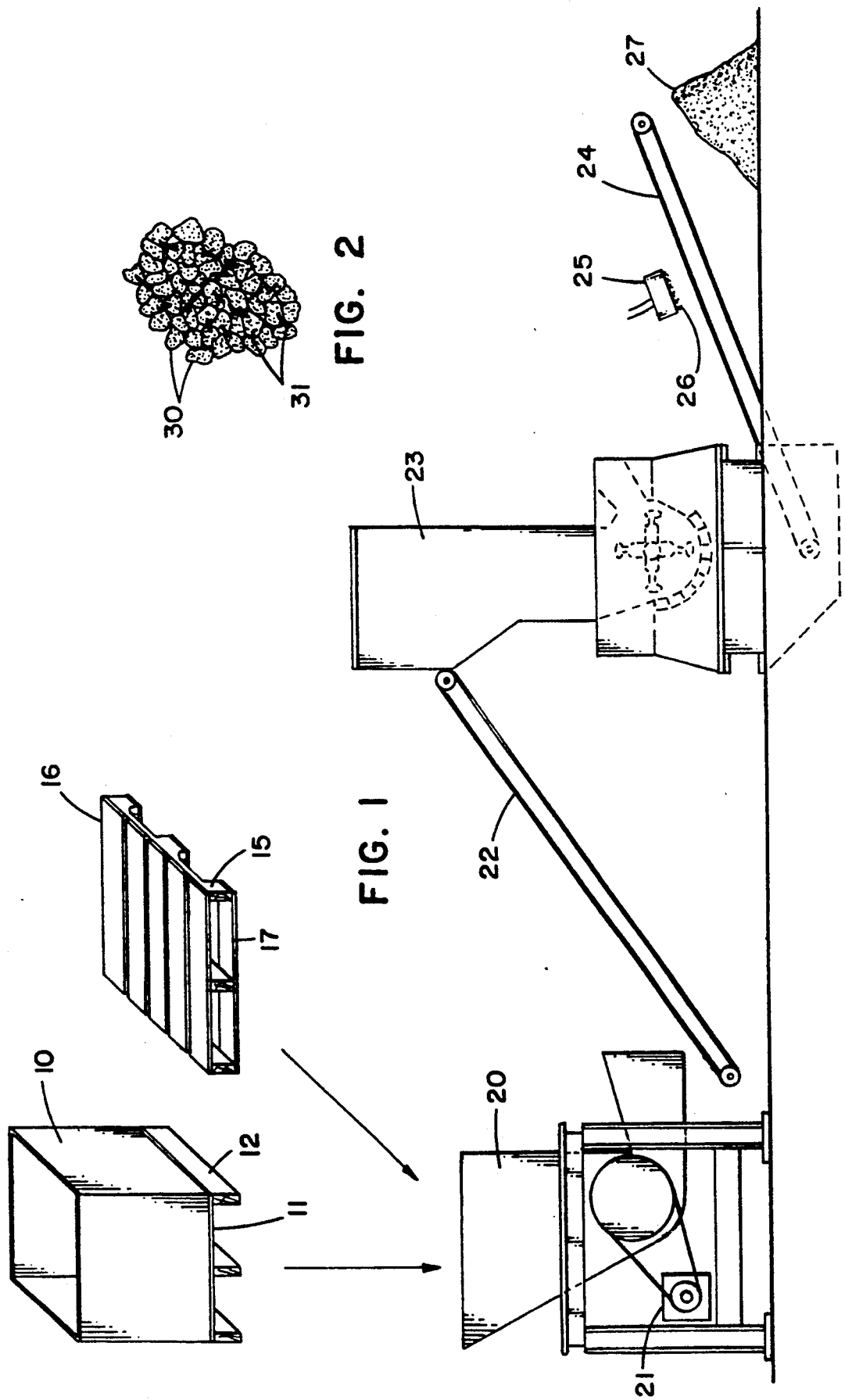

PROCESSED CARDBOARD AND WOOD BEDDING PRODUCT AND METHOD

CROSS-REFERENCE TO RELATED APPLICATION

This application is a Continuation-in-part of my prior co-pending application entitled "Processed Cardboard and Wood Bedding Product and Method", Ser. No. 07/841,713, filed Feb. 26, 1992, now U.S. Pat. No. 5,133,296.

BACKGROUND OF THE INVENTION

1. Field of the Invention

This invention relates to an absorbent animal bedding product and a process for manufacturing the product from heavy cardboard boxes and wood pallets which are used to ship automotive parts and the like to assembly plants. The invention provides not only a superior bedding product but also solves a serious waste disposal problem faced by industries that generate waste pallets and cardboard.

2. Description of the Prior Art

Automotive assembly plants continuously receive automotive parts in heavy cardboard boxes that are attached to wood pallets. After the automotive parts are removed, the boxes and pallets must be disposed of. In some cases, the cardboard boxes are attached to the pallets but in other cases they are not. In the past, the cardboard and pallets have been manually separated and the cardboard has been baled for disposal. The waste material has in some cases been incinerated and in other cases disposed of in garbage dumps or the like. The disposal of these waste products has been time consuming and expensive and has created environmental problems.

At the same time, there has been a serious need for absorbent materials to use as animal bedding products or to absorb chemical spills and the like. A variety of natural materials have been used such as straw or sawdust. The Morgan et al. U.S. Pat. No. 5,044,324, issued Sep. 3, 1991, identifies the composition and usage of many such materials. It is generally desirable that the material be very absorbent, have no ingredients which would create health problems for the animals, and be biodegradable. It is also desirable that the material be readily available on a regular basis in large quantities, at low cost.

Although natural materials such as sawdust, wood chips or wood pellets have been used in the past, they have not always met the needs of feed lot operators or dairy farmers. Sawdust, for example is quite absorbent but layers of sawdust will not support the weight of an animal in a feed lot after it has absorbed substantial amounts of animal excretions. When used with dairy cattle, it will not hold together and may be slippery. Animal litter made from other natural material have similar problems. Also, if the source material is not initially a waste product or if it is not readily available in large quantities near the area where it is to be used, it may be too expensive to produce or transport, or sufficient quantities may not be available to make the process commercially feasible.

SUMMARY OF THE INVENTION

The present invention is the result of recognizing that the waste cardboard and pallets could be utilized to produce a useful animal bedding product that out-performs existing bedding products. In addition to providing a superior bedding product, the present invention also successfully addresses a serious waste disposal problem faced by industries that generate waste pallets and cardboard. I have discovered that by blending the proper percentages of the waste cardboard and wood pallets, and by processing the blended material to the proper size, an expensive waste disposal problem can be solved and a superior bedding product can be obtained that is more valuable than if the cardboard and wood had been separated and sold or disposed of individually. The process is simple and utilizes conventional equipment and the resulting product can be easily transported and utilized in a variety of applications where a product capable of absorbing and accumulating large amounts of waste material is needed.

BRIEF DESCRIPTION OF THE DRAWING

FIG. 1 is a diagrammatic view of apparatus utilized in my invention which depicts cardboard and pallets being first fed through a shredder for an initial reduction in size and then fed through a hammermill for final sizing.

FIG. 2 depicts the general appearance of a portion of the final product resulting from the process shown in FIG. 1.

DETAILED DESCRIPTION OF THE INVENTION

Referring to FIG. 1 there is disclosed a cardboard box 10 mounted on a pallet comprising a wood platform 11 nailed to three longitudinally extending, parallel, spaced pieces of wood lumber, usually 2×4's. A typical platform 11 is three feet wide and four feet long.

Another wood pallet is also shown which comprises three longitudinally extending, spaced boards 15 in the nature of 2×4's or the like with upper and lower platforms 16 and 17 nailed thereto. Platforms 16 and 17 each comprise a series of spaced rough boards nominally ½–1 inch in thickness sawn from rough lumber such as poplar or pine.

The boxes and pallets are manually fed, without disassembly, into a shear-shredder or hammermill 20, shown schematically and reduced in size, which is powered by an electric motor 21. It is noted that the cardboard boxes and pallets are not shown to scale but are enlarged for the purpose of illustration. Shear-shredder 20 is large enough to accommodate receipt of the boxes, pallets and miscellaneous wood pieces without taking them apart or reducing them in size. The material is fed into shredder 20 for primary reduction to a nominal two foot minus size. The blended pieces of cardboard and wood emanating from shredder 20 are deposited on a conveyor 22 which carries the material to a hammermill 23 for final sizing. Product sizing is regulated by changing screen sizes in the hammer-mill 23 in a manner known to those skilled in the art. The final blended product is carried by another conveyor 24 past an electromagnet 25 which removes metal nails 26 from the material by magnetic attraction. The resulting product is accumulated in a pile 27 or directly deposited into a transport vehicle if desired. FIG. 2 schematically discloses a portion of the material in pile 27 wherein the cardboard pieces 30 are thoroughly mixed with the wood chips 31.

It can be seen that processing is accomplished using readily available, off the shelf equipment. The boxes with pallets attached thereto, the separate pallets, or random pieces of wood can be fed into the shear-shredder without disassembly and without removing nails. The nails can be removed magnetically and if excessive dust is produced, it can be removed with a cyclone precipitator and baghouse. The ratio of cardboard to wood can be regulated by simply adding more or less wood or cardboard to the shredder 20 to achieve the desired percentage.

Tests and experiments have been conducted to determine the optimal composition and size of the material. It was determined that for different applications, different material sizes and percentages of cardboard were desirable. It has been determined that for animal bedding or litter the optimal size of the shredded material ranged from one-half (½) inch to one and one-half (1½) inch in length, where the "size" or "length" is the longest dimension of the piece or chip. The optimal percentage of cardboard mixed with wood ranged from 40% cardboard to 90% cardboard by volume. The preferred moisture content is 9% to 15% by weight of the blended material.

For the purpose of determining relative volumes of cardboard and wood, the material is not compressed but is simply separated and measured. It is understood that the uncompressed material will carry a volume of air which will be included in the volumetric measurements and will also include minor amounts of sawdust, dust and the like which will also be included in the measurements. However, the dominant material in each case is either cardboard pieces or wood chips and a comparison is made without compressing the material and without consideration of other materials such as air, sawdust, dust, etc. For example, if the mixture is 50% cardboard pieces and 50% wood chips, and two 50 gallon barrels are used to measure the volumes, both barrels would be full so that when mixed the result would be approximately 100 gallons of the absorbent mixture.

A bedding product with a lower cardboard percentage (40%-60%) and a larger product size (¾ inch to 1½ inch) performed better and was preferred for use with beef cattle in feed lots. The bedding is preferably applied 3 to 6 inches deep and additional bedding is added to existing bedding to form a pack comprising several layers. The larger chip size and lower percentage of cardboard keeps the cattle from sinking into the bedding when new layers of the product are added to the old bedding. The resulting pack that is formed will absorb and support the weight of the animal, while at the same time absorbing and assimilating waste liquid and solid material.

For dairy operations, a different mixture is preferred. The preferred percentage of cardboard in the blended mixture is approximately 60-90% by volume and the preferred size of the cardboard pieces and wood chips range from ¼ inch to 1 inch. This material can be thinly applied to a concrete floor or rubber mat of the dairy stall. The smaller particle size and higher percentage of cardboard is preferred because less wood and smaller particle size minimizes the risk of the animal being scratched or stabbed by a splinter of wood.

Since the original application was filed, further development effort has revealed additional information about the invention. The original application claimed that the wood chips and cardboard pieces ranged in size from approximately ¼ inch to 1½ inches in length. Those figures were intended to be approximate in view of the nature of the shredded material but it is now clear that the range includes pieces or chips having a length of approximately 3/16 inch at the lower end of the range. Further investigation has revealed that this size seems to favored by horse owners, dog kennel owners and owners of turkey operations. By modifying mill screen sizes and types and by adding more efficient dust collection equipment, it is possible to process a product size of 3/16 inch to 1½ inches without creating undue dust problems.

It appears that for some applications it is desirable that the product contain smaller percentages of cardboard. Turkey operations in particular can utilize a product that is not only smaller in size but also drains and wicks moisture away from the birds' feet The preferred percentage range of cardboard pieces for this application is 5% to 20%. The particular mixture for any given situation may depend upon a number of factors including the end use of the material, whether the blended mixture of wood chips and cardboard pieces are used indoors or outdoors, whether the mixture is intended to be removed frequently or allowed to build up into a deep pack and whether the particular user has personal preferences that need to be addressed. Thus, for any given situation, the product size can be varied from about 3/16 or ¼ inch to about 1½ inches and the amount of cardboard pieces in the mixture by volume can be varied from as low as approximately 5% to as high as approximately 90%. Preferred sizes and percentages for certain applications have been suggested but a significant advantage of the present invention is that the various parameters can be adjusted to provide the desired performance in any given application or situation.

In a broad sense, the waste absorbing mixture which includes pieces of shredded cardboard and wood chips is combined in relative amounts effective for forming with a known waste product a relatively dry admixture suitable for absorbing and assimilating the known waste product. If the known waste product is animal excretory materials in both liquid and solid forms, the relative amount of cardboard pieces should be adequate to substantially absorb the liquid, with the wood chips being effective to both absorb liquid and provide stability to the resulting admixture. The resulting, relatively dry admixture which has absorbed and assimilated the waste excretory material can then be easily handled and transported. It can, for example, be spread on fields as fertilizer.

It can be seen that the present invention provides a relatively inexpensive and environmentally sound method of disposing of waste cardboard boxes and wood pallets to provide a biodegradable blend of cardboard pieces and wood chips which can be used for animal bedding purposes or to absorb other waste products.

It will be apparent to those skilled in the art that a variety of modifications may be made to the process and product of the present invention without departing from the spirit and scope of the following appended claims.

What is claimed is:

1. A method of making an animal bedding product from cardboard and wood comprising selecting predetermined amounts of cardboard and wood and shredding the material to provide a blended mixture of wood chips and cardboard pieces ranging in size up to approximately one and one-half inches in length.

2. The method of claim 1 wherein the bedding product is used for turkey operations and comprises between approximately 5%–20% cardboard pieces by volume, and wherein the wood chips and cardboard pieces range from approximately three-sixteenths inch to one and one-half inches in size.

3. The method of claim 1 wherein the bedding product comprises between approximately 5%–90% cardboard pieces by volume, and wherein the wood chips and cardboard pieces range from approximately three-sixteenths inch to one and one-half inches in size.

4. A method of making an animal bedding product from waste cardboard and wood pallets comprising shredding selected amounts of cardboard and wood pallets to provide a blended mixture of wood chips and cardboard pieces comprising approximately 5%–90% cardboard pieces by volume and wherein the wood chips and cardboard pieces range from approximately three-sixteenths inch to approximately one and one-half inches in size.

5. An animal bedding product made from wast cardboard and waste wood comprising a blended mixture of shredded cardboard pieces and wood chips ranging in size up to approximately one and one-half inches in length.

6. The product of claim 5 wherein the bedding product is used for turkey operations and comprises between approximately 5%–20% cardboard pieces by volume, and wherein the wood chips and cardboard pieces range approximately from three-sixteenths inch to one and one-half inches in size.

7. The product of claim 5 wherein the wood chips and cardboard pieces range from approximately three-sixteenths inch to about one and one-half inch in size.

8. A waste absorbing and assimilating product made from cardboard and wood comprising a mixture of cardboard pieces and wood chips wherein the mixture is approximately 5%–90% cardboard pieces by volume and wherein the wood chips and cardboard pieces range from about three-sixteenths inch to about one and one-half inches in size.

9. The product of claim 8 wherein the product is a bedding product used for beef cattle feed lot applications and comprises between approximately 40%–60% cardboard pieces by volume, and wherein the wood chips and cardboard pieces range from approximately three-fourths inch to one and one-half inches in size.

10. The product of claim 8 wherein the product is a bedding product used for dairy cattle and comprises between approximately 60%–90% cardboard pieces by volume, and wherein the wood chips and cardboard pieces range from approximately one-half inch to one inch in size.

11. The product of claim 8 wherein the product is a bedding product used for turkey operations and comprises between approximately 5%–20% cardboard pieces by volume, and wherein the wood chips and cardboard pieces range from approximately three-sixteenths inch to one and one-half inches in size.

* * * * *